(12) United States Patent
Boezi

(10) Patent No.: US 9,149,788 B2
(45) Date of Patent: Oct. 6, 2015

(54) FUEL STABILIZER

(71) Applicant: B3C Fuel Solutions, LLC, Conway, SC (US)

(72) Inventor: Brian Boezi, Cary, NC (US)

(73) Assignee: B3C fuel Solutions, LLC, Conway, SC (US)

( * ) Notice: Subject to any disclaimer, the term of this patent is extended or adjusted under 35 U.S.C. 154(b) by 0 days.

(21) Appl. No.: 14/102,722

(22) Filed: Dec. 11, 2013

(65) Prior Publication Data

US 2014/0357481 A1 Dec. 4, 2014

Related U.S. Application Data

(60) Provisional application No. 61/830,692, filed on Jun. 4, 2013.

(51) Int. Cl.
*C10G 25/00* (2006.01)
*B01J 20/26* (2006.01)
*C10L 1/12* (2006.01)

(52) U.S. Cl.
CPC ............ *B01J 20/261* (2013.01); *C10G 25/003* (2013.01); *C10G 2300/1037* (2013.01); *C10G 2400/02* (2013.01); *C10L 1/1208* (2013.01); *C10L 2270/023* (2013.01); *C10L 2290/541* (2013.01); *C10L 2290/567* (2013.01); *Y10T 29/49826* (2015.01)

(58) Field of Classification Search
CPC ......... B01J 20/02; C01L 1/182; C10G 25/003
USPC ............................................ 502/416; 208/307
See application file for complete search history.

(56) References Cited

U.S. PATENT DOCUMENTS

| 4,133,754 | A | 1/1979 | Bory et al. | |
|---|---|---|---|---|
| 7,550,074 | B2 | 6/2009 | Clark et al. | |
| 2004/0011742 | A1* | 1/2004 | Kuo | 210/694 |
| 2004/0129608 | A1* | 7/2004 | Clark et al. | 208/307 |
| 2005/0241480 | A1* | 11/2005 | Lebowitz et al. | 95/146 |
| 2006/0266338 | A1* | 11/2006 | Kashima et al. | 123/519 |

OTHER PUBLICATIONS

Test A Fabric, 755 Spun Polyester. <http://www.testfabrics.com/product-detail.php?id=TVRNdw==> 2014. Accessed May 12, 2014.*
International Search Report and Written Opinion dated Mar. 4, 2014 for Application No. PCT/US2013/074283.

* cited by examiner

*Primary Examiner* — Richard M Rump
(74) *Attorney, Agent, or Firm* — Frost Brown Todd LLC

(57) ABSTRACT

A device for stabilizing fuel in a fuel tank comprises activated carbon. The activated carbon is configured to be inserted into or installed inside a fuel tank, so that it is in contact with the fuel. The device allows the activated carbon to be in contact with the fuel, but does not allow it to be dispersed in the fuel. A method for stabilizing fuel in a fuel tank comprises adding the device to the fuel tank so that it is in contact with the fuel.

8 Claims, 3 Drawing Sheets

FUEL STABILIZER

CROSS REFERENCE TO RELATED APPLICATIONS

The present application hereby claims the benefit of the provisional patent application of the same title, Ser. No. 61/830,692, filed on Jun. 4, 2013, the disclosure of which is herein incorporated by reference in its entirety.

BACKGROUND

Current fuel formulations, such as for diesel and gasoline, age quickly causing problems with engines. During storage, the hydrocarbons in the fuel react with dissolved oxygen and air, promoting changes to their physical and chemical characteristics. Oxidation products continue to react to form nonvolatile high molecular mass agglomerates commonly called gum. In the carburetor, gum clogs critical circuits, which impede proper engine functions. Today's carburetors have tight tolerances and act as emission control devices. Over time the gum deposits cause problems like: 1) engine stalling, 2) power loss, and 3) increased exhaust emissions. A similar problem occurs with fuel injection and valves in electronically controlled engines. The stability of stored fuel depends on how and where it's stored. As the temperature rises, the amount of gums formed increases to shorten the fuel's useful life.

Liquid fuel additives do a good job at stabilizing fuel, the major problem is that consumers are adverse to adding it to gas and diesel. Consumers are also not aware of the stability problems with today's fuels so they do not do anything to stabilize their fuel.

BRIEF SUMMARY

A device for stabilizing fuel in a fuel tank comprises activated carbon. The activated carbon is configured to be inserted into or installed inside a fuel tank, so that it is in contact with the fuel. The device allows the activated carbon to be in contact with the fuel, but does not allow it to be dispersed in the fuel.

A method for stabilizing fuel in a fuel tank comprises adding a device to the fuel tank so that it is in contact with the fuel, but not dispersed in the fuel. The device comprises activated carbon.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
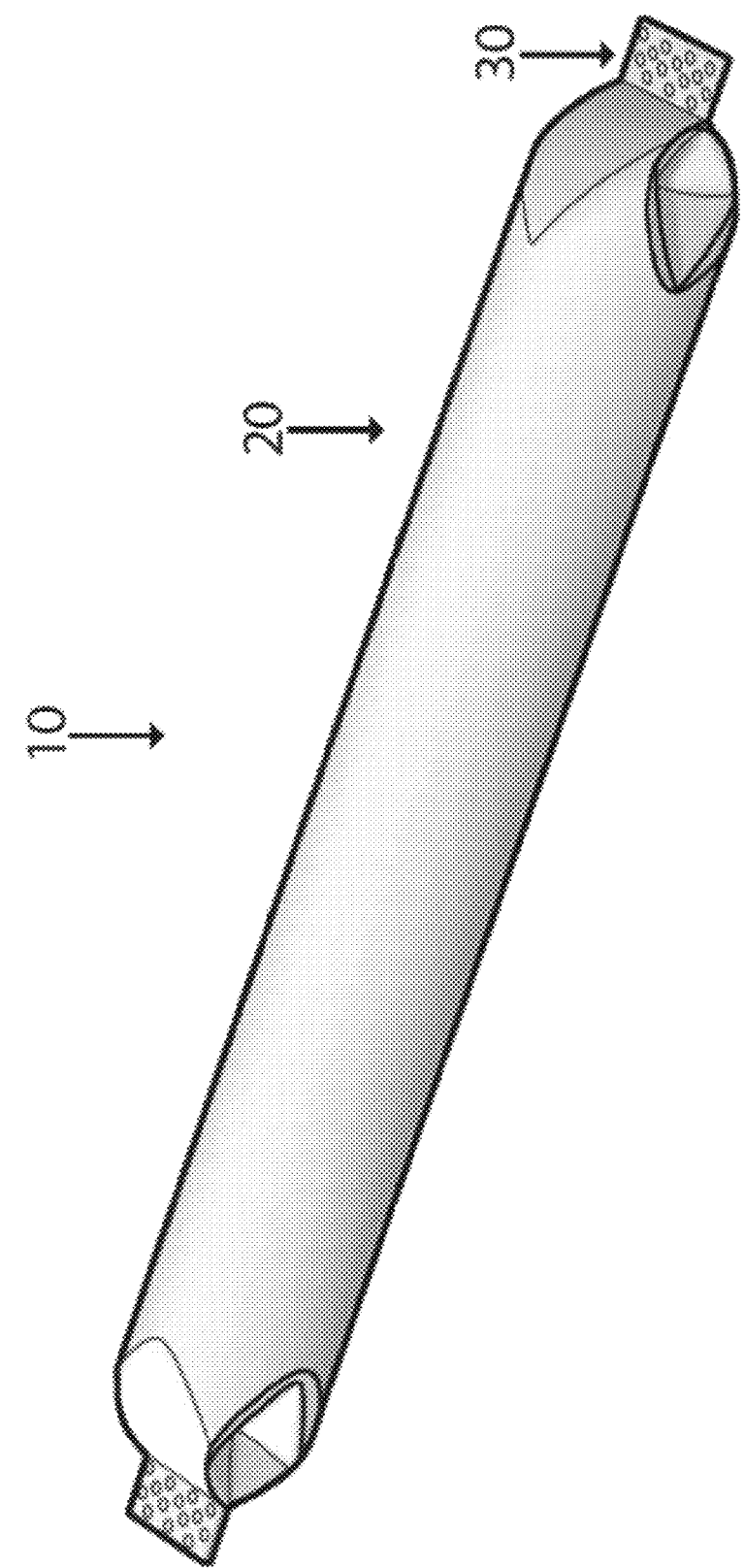
FIG. 1 is a perspective view of some embodiments of the device.

The device increases the stability of fuel in contact with it. The device is designed to be placed into an engine fuel tank or a fuel storage tank so that it is in contact with the fuel, but is not dispersed in the fuel. By allowing the activated carbon to be in contact with the fuel, it is able to improve the stability of the fuel. However, it is not in a form that allows it to be dispersed in the fuel, such as by simply adding powdered activated carbon to the fuel. While some activated carbon may leak out of the device, most all the activated carbon remains as part of the device and does not end up dispersed in the fuel. Carbon that is dispersed in fuel is that in which the carbon particles are spread out in the fuel; when some of the fuel is removed from the tank, some of the dispersed carbon particles can be removed with it. Dispersed carbon may or may not be spread uniformly throughout the fuel.

It is believed that the activated carbon reduces or prevents the formation of gums, by eliminating reactive oxygen, such as peroxides, from the fuel. Gums that are formed in fuel can damage engines that consume the fuel. Reactive oxygen is believed to contribute to the formation of gums or other compounds that reduce the stability of fuel. The device is independent of any fuel additives. To obtain the fuel stabilizing effect, no additional additives need to be added. The fuel remains substantially unchanged during and after being in contact with the device.

In some embodiments, the device may be left in the fuel tank for the life of the engine. Multiple tanks of fuel may be used without a significant decrease in the stability benefits provided by the device. In some embodiments, moderately aged fuel may be stabilized and cleaned by the device reducing damage that may be caused to an engine when the fuel is used.

A fuel tank is a container that is designed to hold fuel for storage, or is attached to an engine to provide the fuel to be consumed by the engine. In some embodiments, a fuel tank is a container that supplies fuel to an engine for combustion. The device may be used in a fuel tank designed to hold fuel for storage or one that is attached to an engine.

In some embodiments, the device (10) comprises a container (20) and activated carbon. The container (20) is made from a material that holds, or retains the activated carbon but allows the gasoline to pass through. The container does not allow the activated carbon to be dispersed in the fuel. The device may be any shape and size, such as for example, a tube of material that is closed at the ends, such as by crimping. Examples of the material include, but are not limited to polyester, polypropylene, and nylon felt. In some embodiments, the material is non-woven nylon fabric. Material that does not hold substantially all the activated carbon within the device is generally not suitable, one such example is Cerex which is available from Cerex Advanced Fabrics, which allows some activated carbon to be released from the device. The device should not allow carbon to pass out of the container into the fuel.

In some embodiments, the weight of the non-woven nylon fabric is from about 2.0 osy (68 g/m2) to about 5.0 osy (170 g/m2), from about 2.0 osy to about 4.0 osy (136 g/m2), from about 3.0 osy to about 4.0 osy, or about 3.0 osy). In some embodiments, the container (20) must maintain dimensional stability across a large temperature range of about −30° F. to about 300° F.; which means it does not allow particles larger than about 0.01 micron, about 0.1 micron, or 0.5 micron to pass through it. In some embodiments, the container is made from polyester felt, which is a synthetic needle punched felt made from polyester fibers. The felt may be used in various densities, such as from about 2 oz to about 30 oz weight, about 5 oz to about 20 oz weight, or about 5 oz to about 10 oz weight. The advantages of a polyester felt fabric container are that it can contain many different activated carbons, allow the fuel to pass through, and maintain its stability.

In some embodiments, as shown in FIG. 1, the device (10) is a container (20) constructed from a tube of polyester fabric that is sealed at both ends of the tube. The tube may be sealed by crimping to form a crimped end (30). It may be crimped by any means, for example by heat, pressure, or both. In some embodiments, the device comprises a container that is only partially made from polyester fabric. The remainder of the container may be made from other fabrics or metal. In some embodiments, the device takes the form of an elongated packet. While the device is designed to remain in the fuel tank, a tether may be attached to the container to assist the removal of the device from a fuel tank.

In some embodiments, the device is formed by compressing the activated carbon with a suitable binder or polymer so it is formed into a solid mass. The solid mass does not release activated carbon to be dispersed in the fuel. The suitable binder, such as crosslinking polymers, is not soluble in gasoline. Examples of binders include carboxymethylcellulose and its derivatives and metal salts, guar gum cellulose, starch, lignin, polyvinyl alcohol, polyacrylic acid, styrene butadiene resins (SBR), polystyrene acrylic acid resins, and reaction products of polyacrylic acid with polyols selected from glycerin, polyvinyl alcohol, lignin, and hydroxyethylcellulose. The device may be formed by mixing the binder and the activated carbon together then applying heat, pressure, or both.

Figure 2:
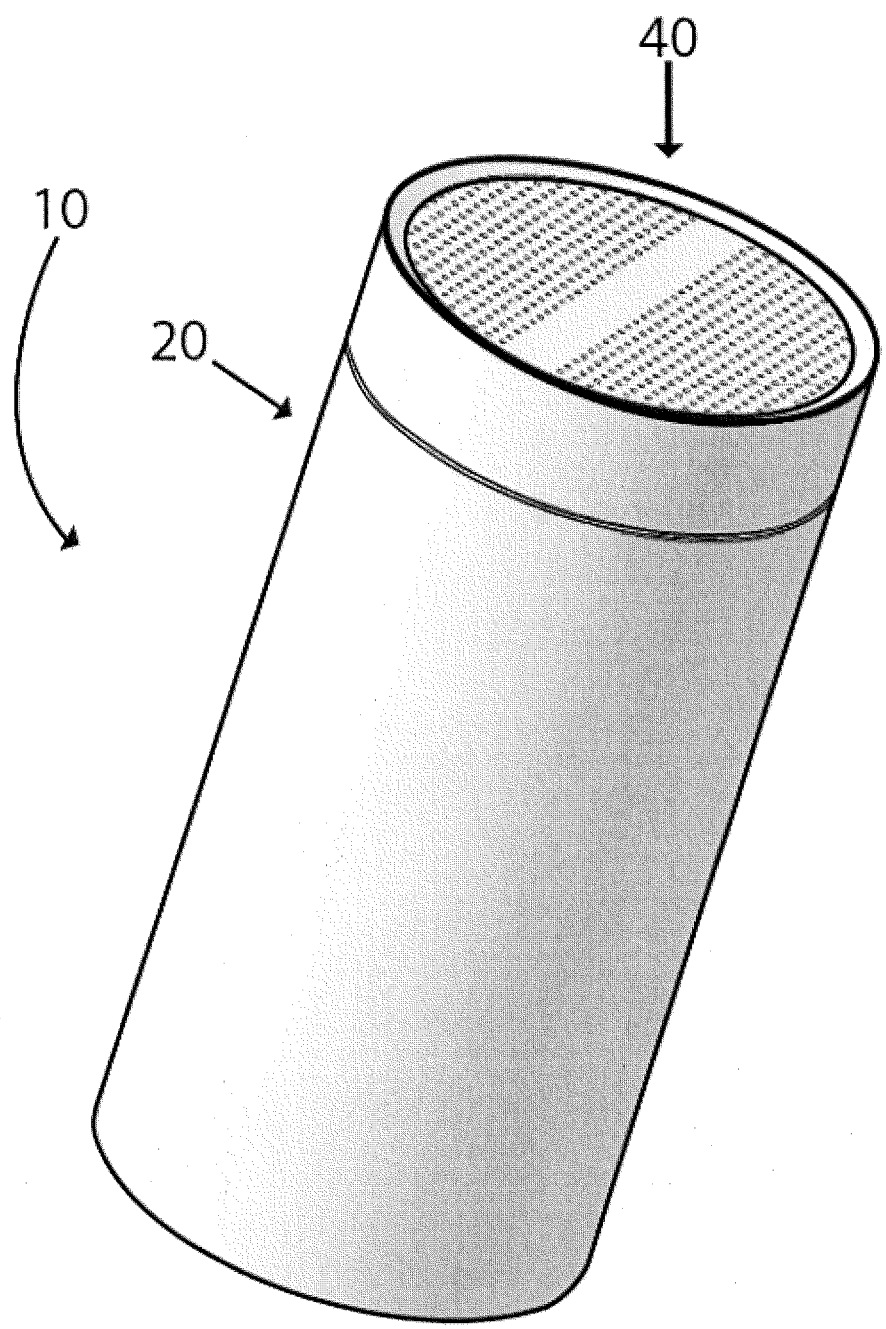
FIG. 2 is a perspective view of some embodiments of the device.
Figure 3:
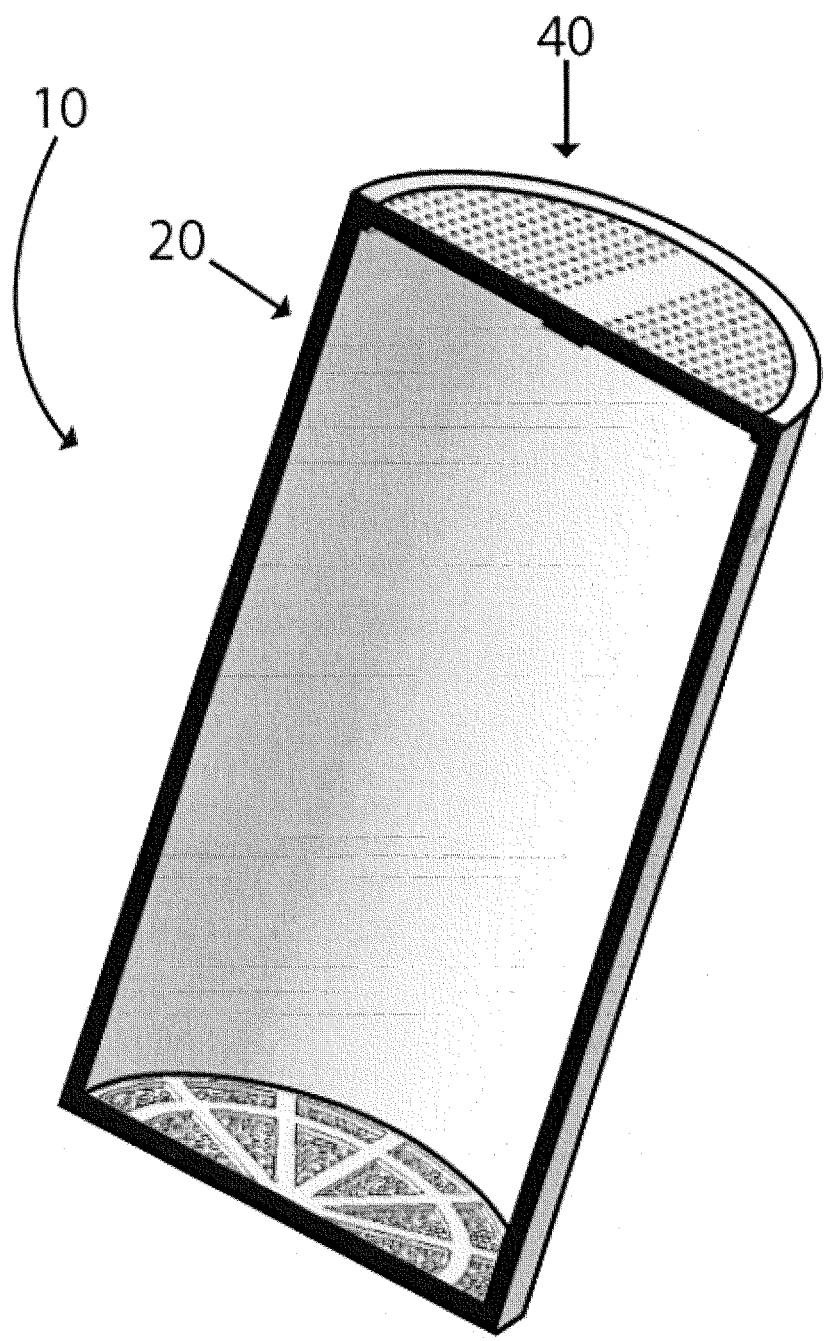
FIG. 3 is a cross section view of the container of some embodiments of the device.

In some embodiments, as shown in FIGS. 2 and 3, the device (10) is contained within a plastic container (20). The container (20) may be a tube with porous tube ends (40) that allow the fuel to flow in and out of the container. The container may be a tube with small openings along the tube. The plastic container may have a cap at one or both ends to retain the activated carbon. The caps may either be solid, or porous.

Activated carbon may be made from many different sources, such as coconut, coal, peat, wood, etc. In some embodiments, the activated carbon is acid washed and has an iodine value above 1000. The size of the activated carbon particles may be from micronized or nano-sized to granular particles, such as mesh sizes of 4-12, 4-14, 12-20, 12-40, 100-325, and 200-325. The surface area of the particles may range from about 600 to about 750 to about 1500 $m^2/g$. In some embodiments, particles with a surface area of about 600 $m^2/g$ have a mesh of 12-20, 12-40, or 100-325. In some embodiments, particles with a surface area of about 750 $m^2/g$ have a mesh of 200-325. In some embodiments, particles with a surface area of about 1500 $m^2/g$ have a mesh of 100-325 or 200-325.

In some embodiments, the activated carbon is doped with quaternary ammonium compounds, such as, but not limited to, tetrabutyl ammonium iodide, potassium iodide, and similar compounds. In some embodiments, the activated carbon is doped with antioxidants; biosurfactants, such as rhamnolipids; or silver compounds. Doping may be performed by mixing the doping material with the activated carbon in a solvent, followed by drying the mixture by heat and/or vacuum. The doped activated carbon can have increased effectiveness or additional properties, such as water removal by means of emulsification.

In some embodiments, additional components may be included in the device, such as desiccants and gelling agents.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Preparation of Device

Polyester felt is wrapped around a mandral and the seam along the length of the formed tube is heat sealed. Activated carbon is inserted into the formed tube and the ends are heat and pressure sealed.

Example 1

A device, as described above, containing 10 grams of activated carbon neutralized 150 milliliters of 35% hydrogen peroxide. This would provide years of stabilization on hundreds of gallons of fuel.

Example 2

ASTM D525 (Control)

Fresh gasoline (regular, 10% ethanol blended gasoline) was placed into a testing chamber and tested in accordance with ASTM D525. The fuel had a stability time of 230 minutes.

Example 3

ASTM D525 (Device)

The test of Example 2 was conducted except a device, as described above, containing 0.5 g of activated carbon was also placed in the testing chamber. The gasoline was tested in accordance with ASTM D525, and found to have a stability time of greater than 480 minutes.

This test in accordance with ASTM D525 was repeated two more times with new fuel using the same previously used device. Each time the fuel had greater than 480 minutes of stability.

By using a single device, at least three samples of gasoline showed a stability increase of at least 250 minutes.

Example 4

Sun and Heat Testing (Control)

Fresh gasoline (32 oz, regular, 10% ethanol blended gasoline) was placed inside a translucent plastic bottle and left outside to be exposed to the sun and weather from spring to summer at Conway, S.C. Every 3 weeks, a new bottle of gasoline was placed outside for a total of four bottles over five weeks. The older the bottle was, the darker the gasoline appeared. The peroxide levels were tested and shown to be above 3 parts per million. When the fuel was tested in a Ryobi 4 cycle handheld blower, it was found to gum up the carburetor.

Example 5

Sun and Heal Testing (Device)

The experiment of Example 4 was conducted simultaneously, except a device, as described above, containing 0.5 g of activated carbon was placed into the bottle with the fresh gasoline. At the end of each 3-week period, the device was removed from the bottle and placed into the new bottle with the fresh gasoline. None of the bottles of gasoline showed any darkening When the samples were tested, they were found to contain no peroxides. When the fuel was tested in a Ryobi 4 cycle handheld blower, the engine ran at the correct RPM with the correct throttle response.

This experiment shows that multiple tanks of fuel may be stabilized with a single device, and surprisingly the fuel remains stable even after the device has been removed.

What is claimed is:

1. A method for stabilizing fuel in a fuel tank comprising adding a device to the fuel tank so that activated carbon is in contact with the fuel, wherein the device comprises the activated carbon, wherein the activated carbon is configured to be inserted into or installed inside a fuel tank, so that it is in contact with the fuel, but is not dispersed in the fuel.

2. The method of claim 1, wherein the device is permanently attached to the fuel tank.

3. The method of claim 1, wherein the device comprises a container, wherein the activated carbon is retained in the container.

4. The method of claim 1, wherein the device comprises a binder, and the activated carbon and binder are compressed to form a solid mass.

5. The method of claim 3, wherein the container is in the form of a tube made of a polyester felt, wherein both ends of the tube are closed.

6. The method of claim 1, wherein the activated carbon is acid washed and has an iodine value above 1000.

7. The method of claim 1, wherein the device improves stability of gasoline by at least 250 minutes in the ASTM D525 test.

8. The device of claim 1, wherein the activated carbon is doped with iodide.

* * * * *